F. H. AND A. R. BUTTERFIELD.
SPEED INDICATOR.
APPLICATION FILED APR. 20, 1920.
1,409,134.
Patented Mar. 7, 1922.
2 SHEETS—SHEET 1.
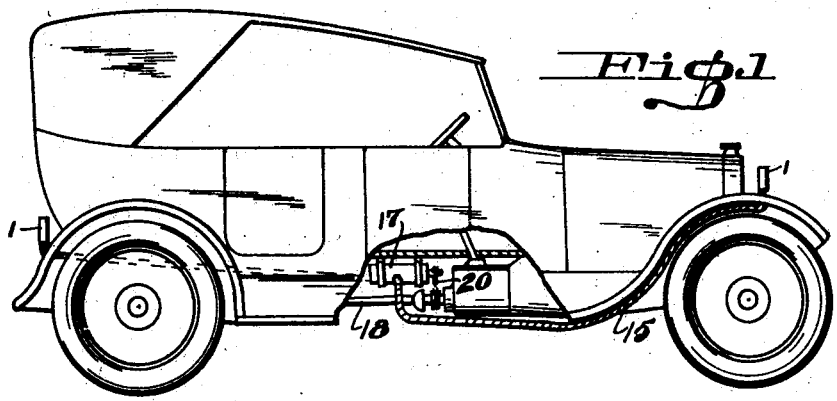
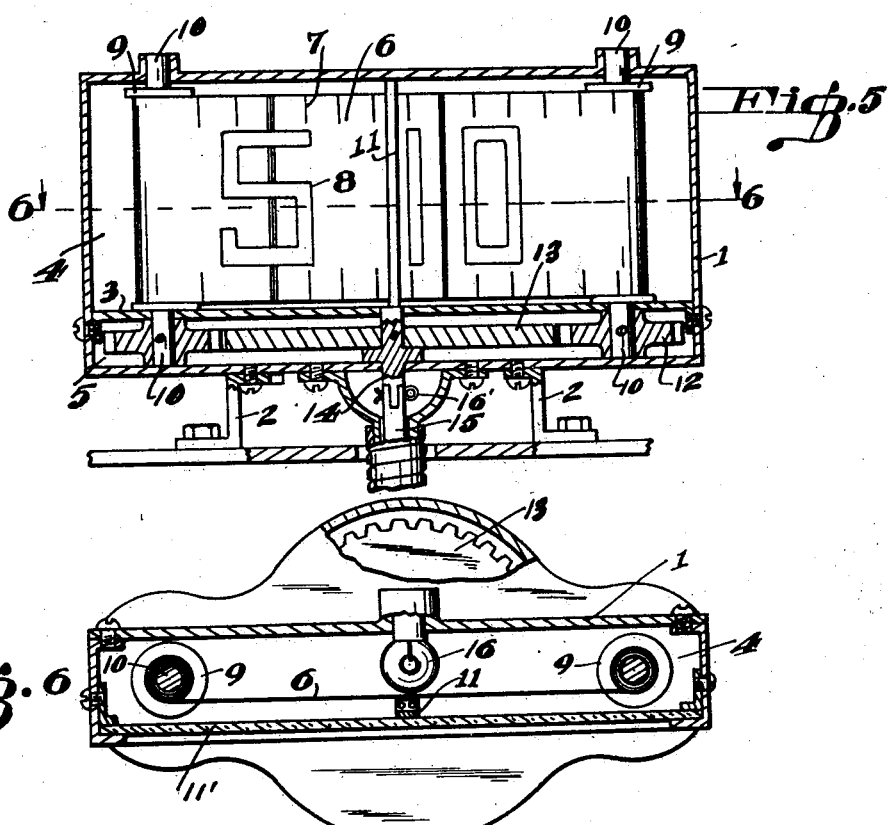
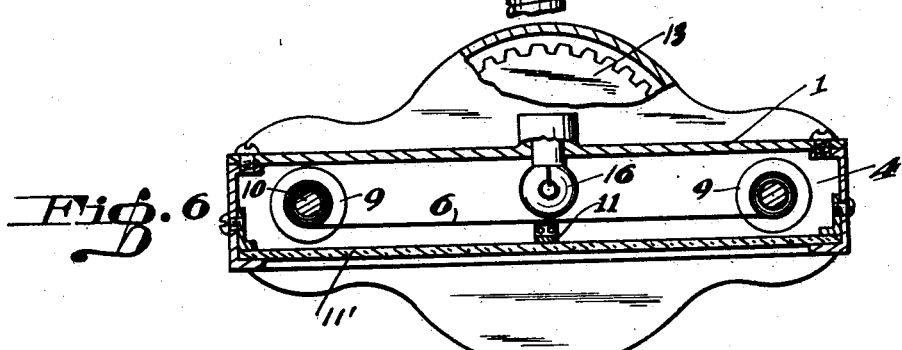
F. H. Butterfield & A. R. Butterfield INVENTORS
BY Hazard & Miller ATTORNEYS

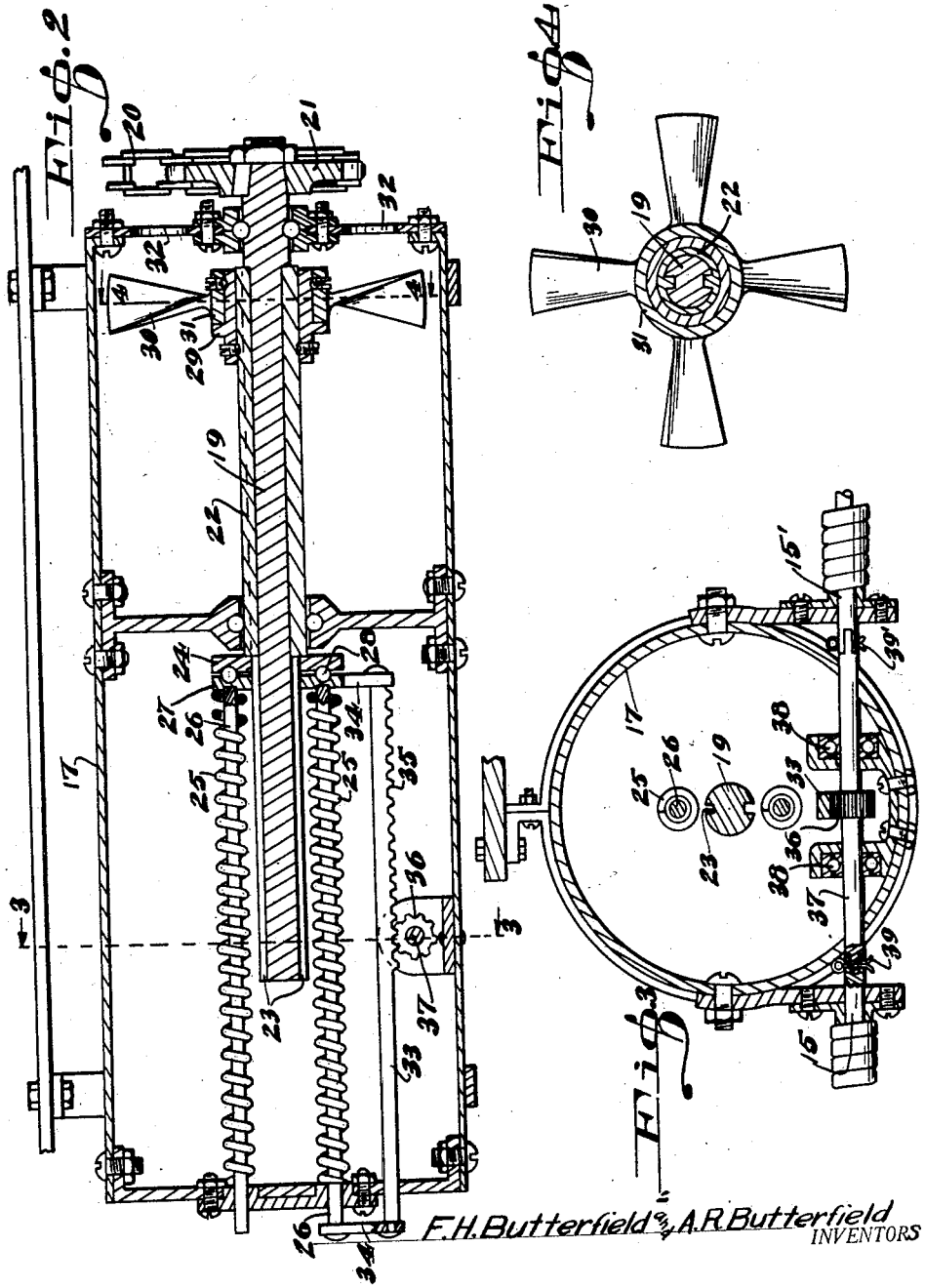

UNITED STATES PATENT OFFICE.

FRED H. BUTTERFIELD AND ALFRED R. BUTTERFIELD, OF LONG BEACH, CALIFORNIA.

SPEED INDICATOR.

1,409,134.

Specification of Letters Patent. Patented Mar. 7, 1922.

Application filed April 20, 1920. Serial No. 375,388.

*To all whom it may concern:*

Be it known that we, FRED H. BUTTERFIELD and ALFRED R. BUTTERFIELD, citizens of the United States, residing at Long Beach, in the county of Los Angeles and State of California, have invented new and useful Improvements in Speed Indicators, of which the following is a specification.

This invention is a speed indicator which is, preferably, so positioned upon a vehicle as to visually indicate to a person not in the vehicle the speed of the same.

The invention will be readily understood from the following description of the accompanying drawings in which;

Figure 1 is a side elevation of an automobile having the improved speed indicator applied thereto.

Fig. 2 is a longitudinal section through the speed responsive mechanism carried by the automobile.

Fig. 3 is a transverse section on the line 3—3 of Fig. 2.

Fig. 4 is a transverse section on the line 4—4 of Fig. 2.

Fig. 5 is a front elevation of the indicating mechanism.

Fig. 6 is a horizontal section through the same on the line 6—6 of Fig. 5.

The registering dial of the speed indicator is shown as mounted in a casing 1. These casings are so positioned upon an automobile as to make the dials visible to a person not in the vehicle, as for instance by mounting the casing upon a fender of the automobile.

In the present embodiment of the invention these dial casings are shown as mounted upon one of each of the front and rear fenders of a machine, so that the indicator dials may be read from a point in front of and from behind the machine respectively. It will be obvious, however, that such dial casings may be mounted upon any one or more of the fenders of an automobile or upon any other suitable portion of the machine.

The dial casing is supported upon brackets 2 and is, preferably, provided with a false bottom 3 forming an upper chamber 4 for the indicator dial and a lower chamber 5 for the operating mechanism for said dial. The indicator dial is shown as a tape 6 suitably graduated, as shown at 7, and having the numerals 8 arranged in connection with said graduations to indicate various speeds.

The tape is rolled upon spools 9 having stub shafts 10 journaled in the upper and lower walls of the dial casing. These spools are so arranged that when oppositely rotated, the tape 6 will be unwound from one spool and wound upon the other to move the graduated tape relative to a stationary indicator bar 11 fixed in the dial casing, the front of said casing, preferably, comprising a glass plate 11', so that the speed registered by said dial may be observed through said glass front.

The means for oppositely rotating the spools 9, preferably, comprises pinions 12 keyed to the respective lower stub shafts 10 and, preferably, arranged within the space 5 of the dial casing. These pinions mesh with and at opposite sides of a gear 13 mounted upon a shaft 14 journaled in the dial casing. A flexible shaft 15 leading to the speed responsive mechanism is connected to the shaft 14 as by a pin 16' so that the rotary movement of said flexible shaft will be communicated to gear 13 and thence to the pinions 12 for moving the dial tape relatively to the indicator 11 proportionally to the degree to which the flexible shaft 15 is rotated. The dial tape 6 is, preferably, of translucent material and an incandescent electric lamp 16 is, preferably, mounted in rear of the tape and is arranged to be lit at night so that the indicator dial will be visible both at night and in the day time.

The speed responsive mechanism connected to the flexible shaft 15, preferably, comprises a casing 17 secured to the frame of the automobile, preferably, adjacent the main transmission shaft 18 of the automobile. A shaft 19 is journaled in this casing and, preferably, extends longitudinally thereof, said shaft being connected to the transmission shaft 18 as by a sprocket chain 20 moving over sprocket wheels 21 fixed upon the transmission shaft and the end of shaft 19 respectively.

A sleeve 22 is mounted upon keys 23 formed upon shaft 19 so that said sleeve is free to slide upon the shaft but will be rotated therewith at a speed proportional to the speed of rotation of the transmission shaft 18. The sleeve 22, preferably, extends only a portion of the length of casing 17, and at its rear end is provided with a bearing collar 24 against which the ends of springs 25 are arranged to abut, these springs being positioned between said bearing collar and the rear end of casing 17.

For this purpose the springs are shown as coil springs surrounding rods 26 having a bearing collar 27 secured to their forward end and arranged to abut against bearing collar 24, preferably, with ball bearings 28 between said bearing collars. The rear ends of rods 26 are shown as guided in the end wall of casing 17, these rods being arranged to be moved lengthwise of the casing by movement of sleeve 22 along shaft 19 and against the tension of spring 25. The sleeve 22 is arranged to be moved longitudinally of casing 17 proportional to the speed of rotation of shaft 19. For this purpose a collar 29 is fixed upon sleeve 22, preferably, at the forward end thereof, and a fan having blades 30 and a hub 31 is fixed upon said collar.

The forward end of casing 17 is suitably apertured as shown at 32, and the blades of the fan are so positioned relative to said apertures that the current of air through said apertures caused by the rotation of the fan will move said fan and sleeve 22 rearwardly along shaft 19 and against the tension of springs 25 a distance proportional to the strength of said current of air which is in turn proportional to the speed of rotation of the fan and the shafts 19 and 18.

A rack bar 33 is carried by rods 26, preferably, upon laterally extending arms 34, this rack bar having teeth 35 meshing with a pinion 36 fixed to a shaft 37 extending transversely of casing 17 and suitably journaled in bearings 38. A flexible connection 15 is connected to one end of shaft 37 as by a pin 39, and if more than one of the indicator dials are employed upon the vehicle the flexible connection 15' from the second indicator may be connected to the opposite end of shaft 37 as by a pin 39'.

It will be noted that the speed of the vehicle will vary proportionally to the speed of rotation of the main drive shaft 18, and the speed of rotation of this shaft transmitted to shaft 19 will cause longitudinal movement of the rods 26 and the rack bar 33 carried thereby a distance proportional to the speed of rotation of shaft 19, as previously described. The rack 33 will in turn turn the flexible connection 15 a distance proportional to the distance which the rods 26 have been moved, and the flexible connection will move the dial tape 6 relatively to the indicator bar 11 a proportional distance so as to indicate the speed of rotation of the machine.

Various changes may be made without departing from the spirit of the invention as claimed.

What is claimed is:

1. A speed indicator comprising a casing having end plates, an intermediate bearing support; openings in one of said end plates, a shaft rotatably supported in said plate; a sleeve carrying a fan slidably mounted on said shaft, said sleeve rotatably supported by said intermediate support, thrust bearing collars slidably mounted on said shaft, guide rods parallel to said shaft and projecting from one of said collars, said rods slidably mounted in said opposite end plate, springs mounted on said rods for yieldably holding said sleeve against axial movement, a rack depending from said collar and rod and slidably supported in said opposite end plate, a pinion rotated by said rack and registering mechanism actuated by the rotation of said pinion.

2. A speed indicator having a casing with shaft supporting members fixed thereto, a shaft rotatably supported by one of said members, a sleeve carrying a fan and slidably mounted on said shaft, said sleeve slidably supported by a second of said members, springs yieldably holding said sleeve against axial movement, said springs mounted on rods slidably mounted in said casing and adapted to be actuated by axial movement of said fan, a rack depending from one of said rods, a pinion having engagement with said rack and registering mechanism actuated by the rotation of pinion.

3. A speed indicator including a shaft rotated by a rotating part of a vehicle, a fan rotated by said shaft and movable along the same, a collar slidable upon said shaft through the sliding movement of said fan, a spring yieldably holding said collar against axial movement, a rack connected to said collar, a pinion rotated by said rack, a shaft projecting from opposite faces of said pinion and rotated thereby, flexible shafts connected to said projecting shafts and registering mechanism actuated through the respective flexible shafts.

4. A speed indicator comprising shaft supports, a shaft rotatably supported by said supports, a sleeve carrying a fan and slidably mounted on said shaft, means for yieldably holding said sleeve against axial movement, movable means for supporting said yieldable means, and a rack actuated by said movable means, a pinion having engagement with said rack and registering mechanism actuated by rotation of said pinion.

5. A speed indicator comprising shaft supports, a shaft rotatably supported by said supports, a sleeve carrying a fan and slidably mounted on said shaft, means for yieldably holding said sleeve against axial movement, means for supporting said yieldable means, said supporting means being movable relative to said shaft, a rack actuated by said supporting means, and a pinion having engagement with said rack and registering mechanism actuated by rotation of said pinion.

In testimony whereof we have signed our names to this specification.

FRED H. BUTTERFIELD.
ALFRED R. BUTTERFIELD.